Jan. 24, 1961 M. O. FELIX ET AL 2,969,457

DIVERSITY RECEIVER

Filed May 9, 1960 2 Sheets-Sheet 1

INVENTOR
Michael O. Felix
Andrew J. Lipinski
BY
R.W.F.
AGENT

Jan. 24, 1961 M. O. FELIX ET AL 2,969,457

DIVERSITY RECEIVER

Filed May 9, 1960 2 Sheets-Sheet 2

INVENTOR
Michael O. Felix
Andrew J. Lipinski
BY
AGENT 2,969,457

DIVERSITY RECEIVER

Michael O. Felix, Aldershot, and Andrew J. Lipinski, Alberton, Ontario, Canada, assignors to Canadian Westinghouse Company, Limited, Hamilton, Ontario, Canada Filed May 9, 1960, Ser. No. 27,638
7 Claims. (Cl. 250—20)

Figures 1, 1A, 2, 3:
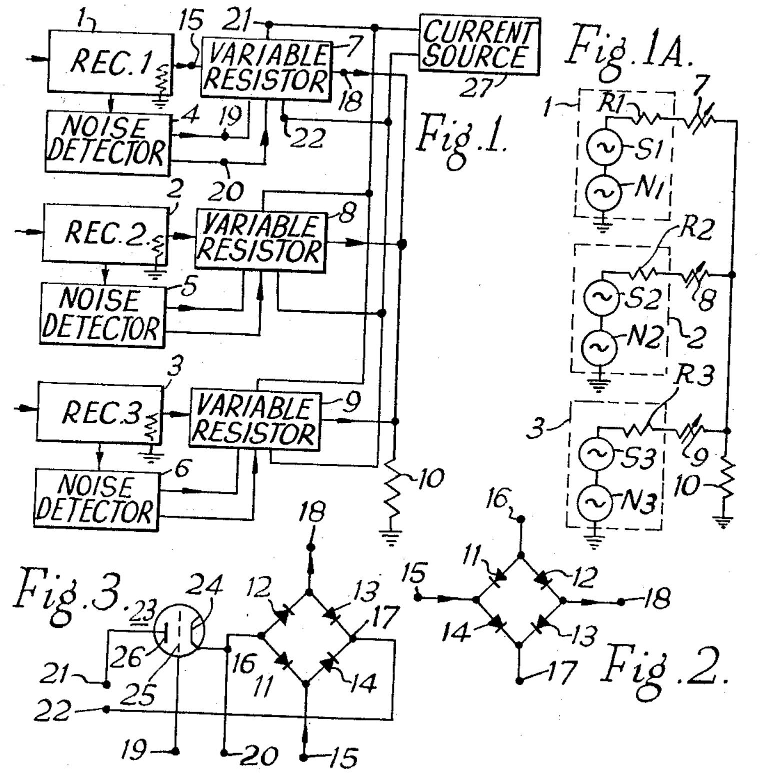

This invention relates to receiving systems and particularly to those forms of receiving systems which utilize more than one receiver channel. Receivers of this type are particularly useful in scatter communication systems. In such systems, it is usual to utilize more than one antenna for receiving, and connected to each antenna is a separate receiver channel. When fading occurs it does not occur uniformly, therefore, the signal in one receiver channel may be stronger than the signal in another. The purpose of diversity reception is to derive best signal to noise ratio from the channels available.

It will be evident that by utilizing a sufficient number of receiver channels it is possible to substantially improve the reliability of the system, since all receivers will not fade simultaneously. However, to utilize the signal from all receiver channels, it is obviously necessary to combine the outputs of the receiver channels in some manner. In some circumstances, it has been possible to simply utilize whichever receiver had the strongest signal at that instant. Such systems used for example conventional relay switching circuits. Alternatively, it would appear possible to simply apply all the receiver channel outputs to a common load. However, in an F.M. system, it will be evident that the receiver or receivers which contain a low signal input will contribute their large noise content in the load. As a result, the noise content from all the receivers will be added in the load, as well as the signal content from the receivers. The result of this will be a lower signal to noise ratio than that of best receiver. An improvement can be obtained if the receivers are coupled into the common load through variable impedances, the instantaneous value of the impedances being a function of the noise content in the particular receiver to which they are connected.

Certain problems are encountered in such a system however, when the noise content of all receivers increases simultaneously. When this occurs, the impedance of the various receivers viewed from the load may approach the impedance of the load. As will later be seen this leads to unsatisfactory operation.

It is therefore, an object of this invention to provide an improved diversity combining system.

It is a further object of this invention to provide an improved diversity combining system in which the apparent source impedance as viewed from the load is essentially constant.

These objects are attained by interrelating the impedances in the receiver channels in such a way that the value of each impedance is not solely a function of the receiver noise but also a function of the total received noise in all receiving channels. By controlling each impedance in accordance with receiver noise but simultaneously interrelating the absolute impedance values the source impedance as seen from the load is constant. Specifically, all impedances are controlled in value by an applied current, the total current applied to all impedances is from a constant current source, but the ratio of current to a particular impedance versus total current is a function of the noise content of the particular receiving channel versus total noise content from all channels.

Figure 4:
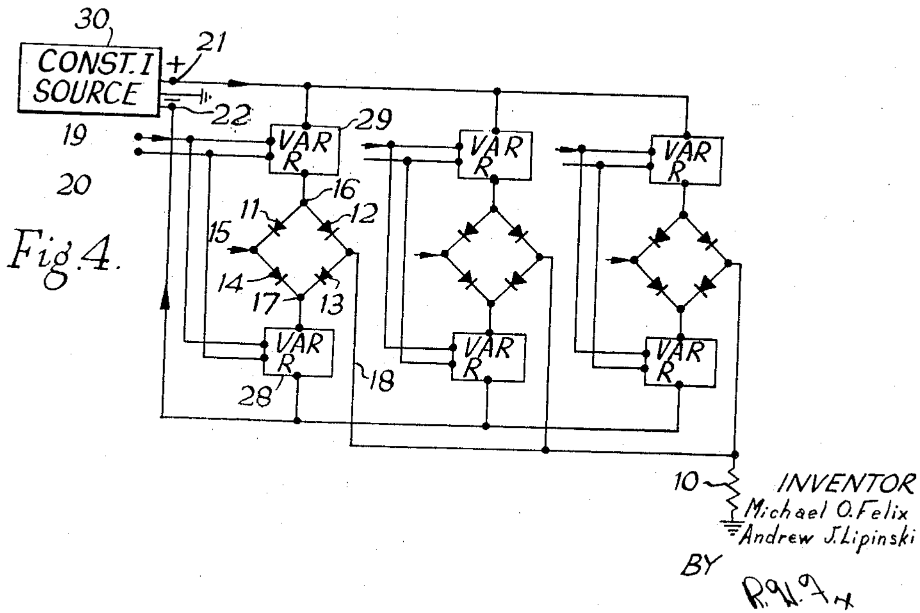
Figures 5, 6:
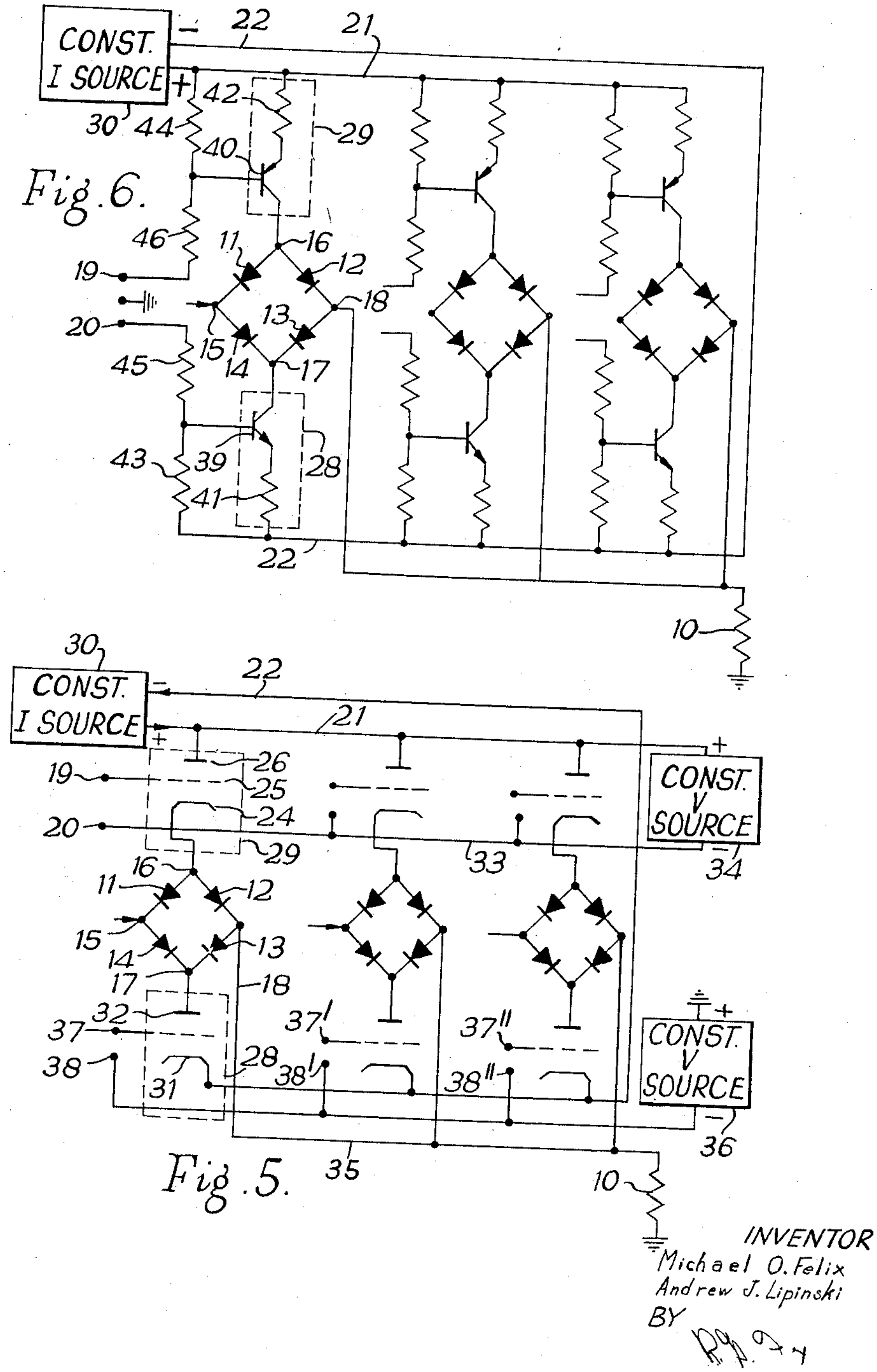

A clearer understanding of our invention may be had from the following description and drawings in which:

Figure 1 is a block diagram of a diversity receiving system incorporating my invention, Figure 1A is an equivalent circuit of the circuit of Figure 1, Figure 2 is a circuit diagram of a bridge capable of utilization as the variable attenuator shown in Figure 1, Figure 3 is a modified version of the bridge showing a control circuit for controlling the resistive value of the bridge, and, Figure 4 is a circuit diagram of a preferred embodiment of our invention, Figures 5 and 6 are further modifications of the circuit of Figure 4.

Considering first Figure 1, there is shown three receivers designated 1, 2 and 3. Each receiver has associated with it a noise detector designated 4, 5 and 6 respectively. It is assumed that each receiver has an associated antenna for receiving incoming signals and that each noise detector selects from the receiver output a certain band of signals which include the noise content of the receiver, but do not include the signal content. This may be done for example, by utilizing a high pass filter which cuts off all signals included in the useful spectrum and retains only the noise content of the spectrum above the useful. It is also assumed that the noise detector converts the noise into a voltage proportional to the noise amplitude. Associated with each receiver is a variable impedance 7, 8 and 9 respectively. The outputs from the variable impedances are applied to the common load 10.

In Figure 1A, there is shown an equivalent circuit for a portion of the circuit of Figure 1. Receivers 1, 2 and 3 are shown as equivalent sources $S_1$, $N_1$, $S_2$, $N_2$, and $S_3$, $N_3$, the "S" sources being signal sources and the "N" sources being noise sources. Each receiver is also shown as including a resistor "R," which is equivalent to the apparent impedance of the receiver. Under normal conditions of operation of an F.M. system, the signals from all sources are equal. For the purposes of explanation, let us assume the following conditions prevail. The impedances of $R_1$, $R_2$ and $R_3$ are less than 7, 8 or 9, which are much less than the load impedance 10. Output voltages are as follows:

| | Volts |
|---|---|
| $S_1$ | 10 |
| $N_1$ | 1 |
| $S_2$ | 10 |
| $N_2$ | 1 |
| $S_3$ | 10 |
| $N_3$ | 10 |

Let us assume also, that the values of impedances 7, 8 and 9 vary as the square of the output of the noise source of the associated receiver.

Then $$9 = 10^2 \times 8 = 10^2 \times 7$$

Considering each signal source, it will be seen that their outputs are all equal and therefore there will be no circulating current for example from $S_1$ through $R_1$, 7, 8, $R_2$, since $S_2$ is equal and opposite to $S_1$. It will be apparent therefore, that the full signal voltage appears on the load. The same is not however true of the noise, since the noise signals are unequal, and may not be added arithmetically. The output from $N_1$ for example, goes through $R_1$, 7, 8, $R_2$ to ground, and $R_1$, 7, 9, $R_3$ to ground. The noise $N_1$ appearing on load 10, disregarding $R_1$, $R_2$ and $R_3$, and assuming load 10 to be a very high impedance, then will be found to be the result of applying $N_1$ to a potentiometer consisting of 7, connected to 8 and 9 in parallel to ground, and will be found to be $$\frac{100}{201}N_1=\frac{100}{201}$$

Similarly, the noise voltage on the load from $N_2$ will equal $$\frac{100}{201}\text{ volts}$$

and the voltage from $N_3$ will equal $$\frac{1}{201}\times 10\text{ volts}$$

The total noise in the load will be found to be approximately .707 volt. The signal to noise ratio in the load will then be 10/.707, which it will be noted is better than the signal to noise ratio of any single channel.

Considering now Figure 2, there is shown a suitable form of circuit for the variable impedance 7, for example. The bridge comprises four diodes 11, 12, 13 and 14. At the junction of diodes 11 and 14 a terminal 15 is indicated. This terminal is the input terminal of the variable resistor, and is similarly designated in Figure 1 in front of resistor 7. Across terminals 16 and 17, a current is now applied, which current must be a function of the signal from the noise detector 4. Under these circumstances, the resistance between terminals 15 and 18 is a function of the current supplied to the bridge through terminals 16 and 17. It will be noted that terminal 18 is therefore the output terminal of the variable impedance, and is also similarly designated on Figure 1. Since the bridge comprises four diodes, these may all be chosen with virtually identical characteristics. If this is so, then the bridge is a balanced bridge and changes of potential applied to one pair of diagonal terminals such as terminals 16 and 17 will not cause changes of potential to appear across the other pair of terminals 15 and 18. This is important, since otherwise the control voltage applied to terminals 16 and 17, for example, might appear in the load 10.

Considering now Figure 3, there is shown here a method of controlling the current through the bridge circuit by means of the signal from the noise detector. Once again, the balanced bridge circuit is used and the same designations are utilized for the corresponding parts in this figure. It will be noted however, that to the terminal 16 is connected a vacuum tube 23 consisting of a cathode 24, a grid 25 and an anode 26. The cathode is directly connected to terminal 16, while the grid and cathode both are connected to terminals 19 and 20 respectively, which it will be noted from Figure 1 are the outputs from the noise detector 4. The other terminal 17 of the bridge is connected to a terminal 22, which it will be noted from Figure 1 is connected to a current source 27. Anode 26 of the tube 23 is connected to terminal 21, which it will be noted is also connected to the current source in Figure 1. As before, terminal 15 is the input terminal, and terminal 18 is the output terminal. It will be evident that as the signal on 19 and 20 varies, the current through the bridge varies. If therefore, the polarity of the signals is properly selected an increase in noise from the noise detector 4 will cause a decrease or negative going signal across terminals 19 and 20, causing tube 23 to cut off, thus gradually increasing the impedance of the bridge seen between terminals 15 and 18. In working out the example relative to Figure 1A, it was assumed that the impedance of 7, 8 and 9 was much less than the impedance of 10. If the noise voltage on all receivers increases simultaneously, it will be evident that with the circuit of Figure 1, 7, 8 and 9 will increase simultaneously, and may approach the value of 10. An analysis of this condition will show that it results in a variable signal in the load, while the preferred condition where the value of 7, 8 and 9 is much less than the value of the load 10, the signal is constant in the load. If, instead of making the impedance of each variable impedance in Figure 1 a function of noise from the associated receiver, it were possible to make the effective impedance of impedances 7, 8 and 9 in parallel, as seen from the load, a constant, then it would be possible to ensure that at no time does the impedance of 7, 8 and 9 simultaneously approach the value of the load. A means of accomplishing this end is illustrated in Figure 4.

Considering this figure, it will be seen that the same designations are used for corresponding parts as were used in Figures 1 to 3. It will also be noted that to maintain terminals 15 and 18 near ground potential, variable resistors are introduced above and below the bridges, and the current source has a positive and negative lead above and below ground respectively. The variable resistors, for example 28 and 29, are controllable by signals applied to terminals 19 and 20, and may correspond to the vacuum tube shown in Figure 3, but it should be understood that they may be any form of variable resistance which may be controlled by a signal. For example, transistors could be utilized. The signals on terminals 19 and 20 therefore, control the resistance of variable resistors 27 and 28. These resistances are varied simultaneously in the same direction, that is, as resistor 27 increases, resistor 28 increases. Current supplied to the bridge, as before, flows through terminals 16 and 17, and of course through the variable resistors 27 and 28. The source of this current, however, is current source 30, which replaces the current source 27 shown in Figure 1. This particular current source is a constant current source, and therefore, the total current through all three bridges is always constant. For the sake of clarity, it has been again assumed that there are only three channels. However, it will be evident that if there were more than three or less than three, a corresponding number of bridge circuits would be necessary. By making current source 30 a constant current source, it will be evident that the current through any bridge must be related to the current through all other bridges. For instance, as the current through one bridge drops, there must be a corresponding increase in currents of the other bridges, in order to maintain a constant total current through all bridges. This therefore means that the resistance of the bridges is an expression of the ratio of noise content in the various channels, rather than an expression of the absolute noise content in each channel, that is, an increase in noise in a channel does not necessarily mean an increase in the resistance of its particular bridge circuit, since there may be a corresponding rise in resistance in the other channels resulting in the same distribution of current in all the bridges irrespective of the fact that the noise content in all channels went up. This therefore means that as long as a particular receiver has a better signal to noise ratio, than the remaining receivers, the resistance of the bridge circuit for this receiver will always be low compared to the resistive value of the bridge circuits for the other receivers, and more particularly, will always be low, relative to the load, this resistance being constant. Therefore, to reiterate, the resistance of the bridge in any receiver channel will be constant for a given ratio of noise content between the receivers, irrespective of the total noise content of any of the receivers.

When it is attempted to utilize a vacuum tube as in Figure 3 in the circuit shown in Figure 4, two problems will be encountered. First, the signal used to control the upper tube must be isolated from the signal used to control the lower tube, because the tubes are floating at different points in the circuit. Second, if the noise content in one receiver is low, the total voltage required from the constant current source may be less than 100-volts, but if the noise content in all receivers is high, the total voltage required from the constant current source may be many hundreds of volts. This of course leads to difficulty in designing an adequate constant current supply, and in choosing suitable tubes. To avoid the second problem the circuit shown in Figure 5 may be used.

In this figure, as in previous figures, the same designations are used when applicable. It will be seen that a series of bridges are again used as variable attenuators. The first bridge shown consists of diodes 11, 12, 13 and 14 arranged as originally shown in Figure 2 with the signal from the receiver being applied on conductor 15 and proceeding to load 10 through conductor 18. As in Figure 3, the current through the bridge is controlled by electronic tubes, except in this circuit a tube is introduced above and below the bridge so that the conductors 15 and 18 are maintained at a point near ground and do not vary in potential as the current through the bridge is varied. The components within the dotted lines are collectively designated 28 and 29, since they correspond in function to the variable resistor 28 and 29 in Figure 4. A constant current source 30 is connected between the anode 26 of the upper tube and cathode 31 of the lower tube. The path of the current from source 30 is therefore down conductor 21 to anode 26 to cathode 24 through diodes 11 and 14 and 12 and 18 to terminal 17 to anode 32 to cathode 31 through conductor 22 to source 30.

Terminal 20 and conductor 33 are maintained a fixed voltage below conductor 21 by constant voltage source 34. Conductor 35 is maintained a fixed voltage below ground by constant voltage source 36. A signal is now applied to terminals 19 and 20, this signal being inversely proportional to the noise in the receiver. A corresponding signal is applied to terminals 37 and 38.

Let us assume the voltages of sources 34 and 36 are both equal to V. Then conductor 33 is V volts below the potential of conductor 21, and conductor 35 is V volts below ground. Let us assume a signal M is applied to terminals 37 and 38 and 19 and 20, and a signal M' to terminals 37' and 38', and a signal M'' to terminals 37'' and 38''. If $M=M'=M''$, we can assume the current in each tube is equal and equals one third of the constant current. If now all signals M, M', and M'' increase by the same amount the currents must still be equal and must still equal one third of the constant current. If the current in a tube remains the same, it will be evident that the grid to cathode potential must be essentially the same. At any instant, the potential on conductor 22 must be ($V+M+$the grid to cathode voltage) below ground, and the potential on conductor 21 is ($V+M+$the grid to cathode voltage) above the cathode voltage of tube 29 which is always close to ground potential in this balanced circuit. Therefore, the total potential across conductors 21 and 22 will always be approximately $2V+2M+$the grid to cathode voltage of both tubes. As the variation of grid to cathode voltage required to produce a wide variation of anode current is not great and the total signal range, i.e., variation of M is not great compared to V, it will be found that the total voltage variation required of source 30 is considerably reduced by use of the circuit of Figure 5. It will also be found that the bridge remains at ground potential, irrespective of current variations, as long as the signal on terminals 19 and 20 equals the signal on terminals 39 and 37.

The problems encountered when utilizing vacuum tubes in the circuit of Figure 4, are substantially overcome when transistors are substituted. A circuit of this nature is illustrated in Figure 6, which makes use of the special characteristics of transistors. As before, corresponding components bear the same designation in this figure as in previous drawings. The variable resistors 28 and 29 in this circuit comprise transistors 39 and 40, and resistors 41 and 42. It will be noted that the transistors are different types, one being N–P–N, and the other P–N–P. Control signals are applied from terminals 19 and 20 to the bases of both transistors. These signals are balanced about ground, so that when terminal 19 goes 1 volt positive terminal 20 goes 1 volt negative relative to ground. Resistors 43, 44, 45 and 56 are necessary to the proper operation of the transistors and their value will depend upon the other components in the circuit as well as the transistors and voltages used. In a typical example, the potential across terminals 19 and 20 varied from 0 to 20 volts, constant current source 30 was capable of supplying from 10 to 30 volts, and resistors 41, 42, 43 and 44 were in the neighborhood of one thousand ohms, while resistors 45 and 46 were about ten thousand ohms. As in the previous circuit, with properly matched components, terminals 15 and 18 will be found to be near ground potential. With the circuit as shown, the effective resistance of 28 will increase when the effective resistance of 29 increases. No attempt is made in this circuit, as was made in the circuit of Figure 5, to avoid wide voltage variations of the constant current source since with transistors the maximum voltage required from the constant current source is relatively low and conveniently available. The circuit has been described in this case relative to only the first receiver, but it will be appreciated from the diagram, that further receivers will have corresponding associated circuits.

While certain specific examples have been utilized to explain the invention, it should be understood that other variations are possible. For example, while a balanced form is shown in Figure 4, it should be understood that the unbalanced form of Figure 3 may also be utilized with a constant current source applied to terminals 21 and 22. Also, while the invention has been described primarily with specific reference to receiver 1 channel, there must of necessity be corresponding circuitry and function in the remaining receiver channels, which, as has been previously indicated may comprise any number of receivers, greater than one. The control signals utilized for varying resistors 7, 8 and 9 or their equivalents have been described as being derived from noise detector circuits—it will be understood that any suitable source may be utilized. It is only necessary that the signals utilized be a function of the absolute signal to noise ratio of the receivers or alternatively, the relative signal to noise ratio of the receivers.

We claim:

1. A diversity receiving system comprising a plurality of receiving channels, a common load for said receiving channels, a detector in each of said receiving channels for producing signals representative of the signal to noise ratio of the associated receiving channel, individual impedances, variable in accordance with a control current, interposed between each of said receiving channels and said load, a source of constant current connected to all of said impedances to determine the value of said impedances and means to control the current applied to the individual impedances in accordance with signals representative of the signal to noise ratio of the associated receiving channel.

2. A diversity receiving system comprising a plurality of receiving channels, a common load for said receiving channels, a detector in each of said receiving channels for producing signals representative of the signal to noise ratio of the associated receiving channel, individual impedances each having two pairs of terminals and variable in impedance between one pair of terminals in accordance with a control current applied to the other pair of terminals, said one pair of terminals of each impedance being connected between each of said receiving channels and said load, potential variations across said other pair of terminals producing no potential variations across said one pair of terminals, a source of constant current connected to all of said impedances to determine the value of said impedances and means to control the current applied to the individual impedances in accordance with signals representative of the signal to noise ratio of the associated receiving channel.

3. A diversity receiving system comprising a plurality of receiving channels, a common load for said receiving channels, a detector in each of said receiving channels for producing signals representative of the signal to noise ratio of the associated receiving channel, individual impedances comprising balanced diode bridges, each having two pairs of diagonal terminals and variable in impedance in accordance with a control current applied to one pair of diagonal terminals, and having the remaining terminals of each bridge connected between one of said receiving channels and said load, a source of constant current connected to all of said bridges to determine the impedance of said bridges and means to control the current applied to the individual impedances in accordance with signals representative of the signal to noise ratio of the associated receiving channel.

4. A diversity receiving system comprising a plurality of receiving channels, a common load for said receiving channels, a detector in each of said receiving channels for producing signals representative of the signal to noise ratio of the associated receiving channel, individual impedances, variable in accordance with a control current, interposed between each of said receiving channels and said load, a source of constant current connected to all of said impedances to determine the value of said impedances and further variable impedances responsive to the said signals interposed between said source of constant current and said individual impedances.

5. A diversity receiving system comprising a plurality of receiving channels, a common load for said receiving channels, a detector in each of said receiving channels for producing signals representative of the signal to noise ratio of the associated receiving channel, individual impedances each having two pairs of terminals and variable in impedance between one pair of terminals in accordance with a control current applied to the other pair of terminals, said one pair of terminals of each impedance being connected between each of said receiving channels and said load, potential variations across said other pair of terminals producing no potential variations across said one pair of terminals, a source of constant current connected to all of said impedances to determine the value of said impedances and further impedances variable in response to the said signals interposed between said source of constant current and said individual impedances.

6. A diversity receiving system comprising a plurality of receiving channels, a common load for said receiving channels, a detector in each of said receiving channels for producing signals representative of the signal to noise ratio of the associated receiving channel, individual balanced diode bridges each having two pairs of diagonally opposed terminals and variable in accordance with a control current applied to one pair of diagonal terminals, and having the remaining terminals of each bridge connected between one of said receiving channels and said load, a source of constant current connected to all of said bridges to determine the impedance of said bridges and impedances variable in response to the said signals interposed between said constant current source and said bridges.

7. A diversity receiving system comprising a plurality of receiving channels, a common load for said receiving channels, a detector in each of said receiving channels for producing signals representative of the signal to noise ratio of the associated receiving channel, individual balanced diode bridges each having two pairs of diagonally opposed terminals variable in impedance in accordance with a control current applied to one pair of diagonal terminals, and having the remaining terminals of each bridge connected between one of said receiving channels and said load, a source of constant current connected to all of said bridges to determine the impedance of said bridges and impedances variable in response to the said signals interposed between said constant current source and said bridges, said impedances while varying in response to the said signal combining to present a relatively constant load to said constant current source.

References Cited in the file of this patent

UNITED STATES PATENTS

| | | |
|---|---|---|
| 2,122,748 | Mayer | July 5, 1938 |
| 2,208,953 | Weber | July 23, 1940 |
| 2,835,867 | Golden | May 20, 1958 |

FOREIGN PATENTS

| | | |
|---|---|---|
| 792,124 | Great Britain | Mar. 19, 1958 |